W. S. ANDREWS.
ELECTRIC HEATER.
APPLICATION FILED JUNE 12, 1908.
1,076,858.
Patented Oct. 28, 1913.
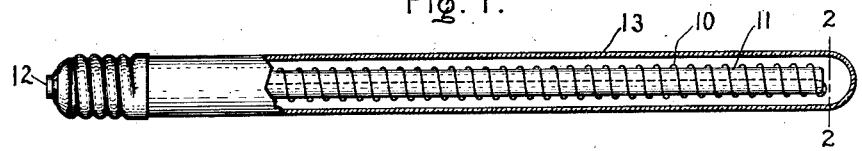
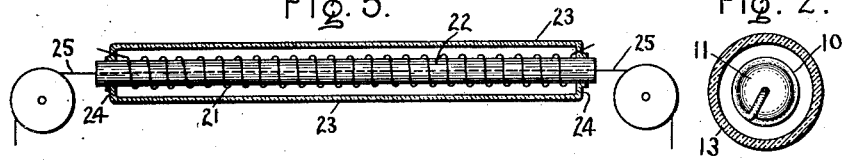 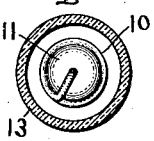
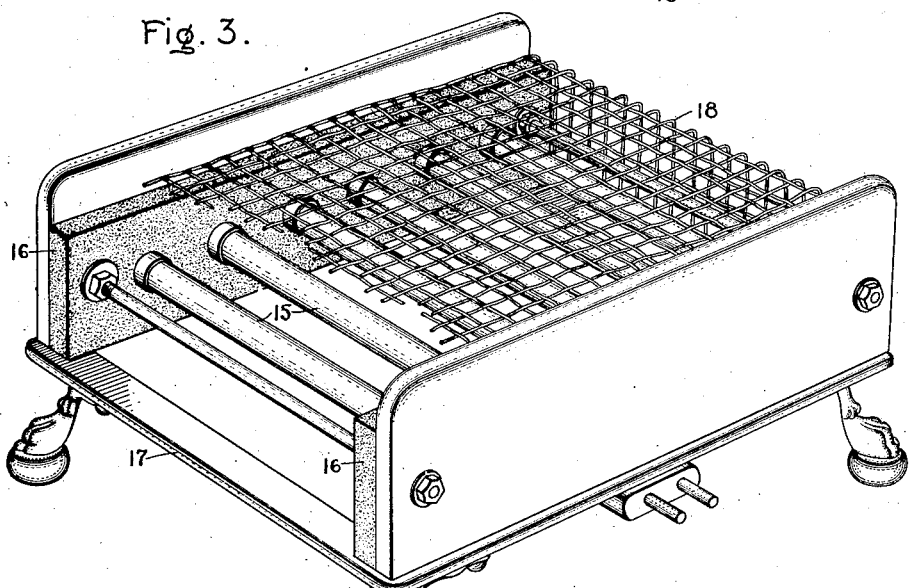
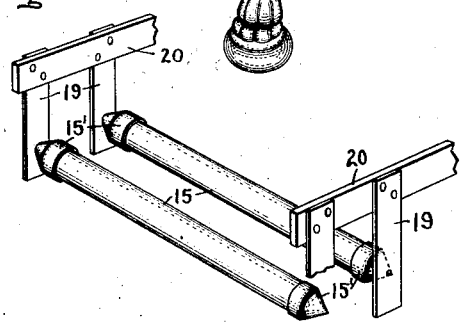
Witnesses:
J. Earl Ryan.
J. Ellis Glen.
Inventor:
William S. Andrews,
by Allen S. Davis
Atty.

UNITED STATES PATENT OFFICE.

WILLIAM S. ANDREWS, OF SCHENECTADY, NEW YORK, ASSIGNOR TO GENERAL ELECTRIC COMPANY, A CORPORATION OF NEW YORK.

ELECTRIC HEATER.

1,076,858.  Specification of Letters Patent.  Patented Oct. 28, 1913.

Application filed June 12, 1908. Serial No. 438,101.

*To all whom it may concern:*

Be it known that I, WILLIAM S. ANDREWS, a citizen of the United States, residing at Schenectady, county of Schenectady, State of New York, have invented certain new and useful Improvements in Electric Heaters, of which the following is a specification.

This invention relates to electric heaters, and has for its object the provision of a device of this character which may be raised to a relatively high temperature without deterioration, which will be simple and cheap to construct, and at the same time be reliable, efficient and durable.

One of the objects of my invention is to produce an electric heating device provided with a protective and insulating covering which is infusible at any ordinary high temperature, and which at the same time will retain its insulating properties and will not be affected by sudden changes in temperature. I have found that fused silica is very well suited for this purpose. In certain methods of cooking, such for instance as broiling and toasting, radiant heat is necessary in order to produce the best results. This radiant heat is usually supplied in electric heating devices from a heating resistance generally consisting of a bare wire or other material which is brought up to a high temperature by the passage of an electric current. This use of a bare conductor is dangerous and unhygienic. By placing the conductor within a protecting envelop or tube of fused silica, the above noted defects are entirely avoided, and the silica becomes incandescent and radiates heat abundantly. By reason of its high fusing point the silica may be brought to a much higher temperature than is ever required for cooking without suffering any injury or becoming softened in the slightest degree. This material is moreover a perfect insulator, and unlike glass or enamels retains its insulating properties when raised to a high temperature. It cannot be oxidized or injured by heat or moisture nor is it affected by acids other than hydrofluoric. Furthermore it does not appreciably change its volume under wide ranges of temperature. This last-named property permits it to be plunged while red hot into cold water without cracking. In this respect it differs entirely from glass and all kinds of enamel. The commercial material is moreover semi-transparent, thus enabling a person to determine by the eye the temperature which is reached.

In the accompanying drawing in which I have shown my invention embodied in a number of concrete forms, Figure 1 is a view partly in section of an immersion heater; Fig. 2 is a section thereof; Fig. 3 is a perspective view of a toaster embodying my invention; Fig. 4 is a detail of the support for the tubes for the toaster; and Fig. 5 is an annealing furnace for wire.

Referring to the drawing (Figs. 1 and 2), 10 is a resistance conductor spirally wound upon a tube of refractory material, such as tube 11 of fused silica. One terminal is brought back through the tube and connected with a plug connection 12; the other terminal being connected to the screwed part of the plug connection, the heating unit being thus adapted for connection to electric circuit through a socket. A tube 13 of fused silica or the like surrounds the resistance spiral and has one end sealed over and the other secured to plug 12 so as to completely protect the conductor. This conductor is preferably of high electrical resistance, is heat refractory to an extraordinary degree, and does not readily oxidize when subjected to a prolonged red heat in the atmosphere. It has a melting point between 1400 and 1500 degrees centigrade. Such a conductor is disclosed in the patent to J. T. H. Dempster, No. 901,428. The resistance may become red hot and heat will be transmitted to the tube 13 which in turn will become incandescent. This tube may then be used as an immersion heater and plunged into water.

In Fig. 3 I have shown another use of my invention. In this case a plurality of tubes 15 are mounted side by side on insulating blocks 16. These blocks are set upon a frame 17 and supported on legs in a well-known manner. A screen 18 is arranged to cover the tubes and be out of contact with them as shown. In this way the radiant heat of the tubes will be transmitted to the food to be toasted or broiled. A convenient way for mounting the tubes is shown in Fig. 4 in which the ends of the tubes are formed of pointed metallic caps 15' which fit into strips 19 arranged in parallel upon a longitudinal strip 20.

In Fig. 5 I have shown another embodiment of my invention in which a tube of fused silica is used as an annealing furnace for wire. In this case the conductor 21 is mounted upon a tube 22, which tube in turn is mounted within a fused silica tube 23, and supported therein by sealing the ends 24, and the wire 25 which is to be annealed runs through the tube as shown.

Various other uses and applications of my invention will suggest themselves to those skilled in the art, and while I have shown my invention embodied in a number of concrete forms, it should be understood that I do not limit my invention thereto except in so far as it is limited by the scope of the claims annexed hereto.

What I claim as new and desire to secure by Letters Patent of the United States, is—

1. In an electric heater, the combination of a quartz covering, and a continuous metallic heating resistance of greater length than said covering located inside the same and having a melting point lower than the melting point of said covering whereby said resistance may be raised to a temperature above its glowing point without endangering said covering, substantially as described.

2. In an electric heater, the combination of a quartz covering, a continuous metallic heating resistance of greater length than said covering located inside the same and having a melting point lower than the melting point of said covering whereby said resistance may be raised to a temperature above its glowing point without endangering said covering, and means for connecting said resistance to a source of current, substantially as described.

3. In an electric heater, the combination of a quartz covering, a support within said covering and a continuous metallic heating resistance of greater length than said covering mounted upon said support, the melting point of the said heating resistance being lower than the melting point of the covering whereby said resistance may be raised to a temperature above its glowing point without endangering said covering.

4. In an electric heater, the combination of a closed quartz covering, a support sealed within said covering and a metallic heating resistance of greater length than said covering mounted upon said support and having a melting point lower than that of said covering whereby said resistance may be raised to a temperature above its glowing point without endangering said covering.

5. In an electric heater, the combination of a quartz tube, a quartz rod within said tube, and a continuous metallic heating resistance wound upon the said rod and having a melting point lower than that of said tube whereby said resistance may be raised to a temperature above its glowing point without endangering said tube.

In witness whereof, I have hereunto set my hand this 11th day of June, 1908.

WILLIAM S. ANDREWS.

Witnesses:
BENJAMIN B. HULL,
HELEN ORFORD.